United States Patent
Yeon et al.

(10) Patent No.: US 10,950,387 B2
(45) Date of Patent: Mar. 16, 2021

(54) MULTILAYER CAPACITOR

(71) Applicant: SAMSUNG ELECTRO-MECHANICS CO., LTD., Suwon-si (KR)

(72) Inventors: Yong Jin Yeon, Suwon-si (KR); Jung Min Park, Suwon-si (KR); Byeong Gyu Park, Suwon-si (KR); So Ra Kang, Suwon-si (KR); Jea Yeol Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 43 days.

(21) Appl. No.: 16/533,064

(22) Filed: Aug. 6, 2019

(65) Prior Publication Data

US 2020/0152390 A1 May 14, 2020

(30) Foreign Application Priority Data

Nov. 12, 2018 (KR) .................. 10-2018-0138076

(51) Int. Cl.
*H01G 4/30* (2006.01)
*H01G 4/228* (2006.01)
(Continued)

(52) U.S. Cl.
CPC .............. *H01G 4/30* (2013.01); *H01G 4/012* (2013.01); *H01G 4/12* (2013.01); *H01G 4/228* (2013.01)

(58) Field of Classification Search
CPC ........ H01G 4/1227; H01G 4/12; H01G 4/232; H01G 4/30; H01G 4/012; H01G 4/228
See application file for complete search history.

(56) References Cited

U.S. PATENT DOCUMENTS 9,099,247 B1 8/2015 Kitano et al.
2010/0300740 A1 12/2010 Ichiyanagi et al.
(Continued)

FOREIGN PATENT DOCUMENTS

JP 2005-197530 A 7/2005
JP 2011-3845 A 1/2011
(Continued)

OTHER PUBLICATIONS

Office Action issued in corresponding Korean Patent Application No. 10-2018-0138076 dated Nov. 19, 2019, with English translation.

*Primary Examiner* — Michael P McFadden
(74) *Attorney, Agent, or Firm* — Morgan, Lewis & Bockius LLP

(57) ABSTRACT

A multilayer capacitor includes a body including a stacked structure having dielectric layers, and internal electrodes, and external electrodes. The body has a central portion, and cover portions disposed above and below the central portion, the body has a first surface and a second surface to which the internal electrodes are exposed and which oppose each other, a third surface and a fourth surface which oppose each other in the stacking direction of the dielectric layers, and a fifth surface and a sixth surface which are connected to the first to fourth surfaces and oppose each other, and a surface roughness of each of the third to sixth surfaces of the body is greater than a surface roughness of each of the first and second surfaces of the body.

20 Claims, 18 Drawing Sheets

(51) Int. Cl.
*H01G 4/12* (2006.01)
*H01G 4/012* (2006.01)

(56) References Cited

U.S. PATENT DOCUMENTS

| | | | |
|---|---|---|---|
| 2015/0016014 A1 | 1/2015 | Park et al. | |
| 2015/0021073 A1 | 1/2015 | Kim | |
| 2017/0345571 A1 | 11/2017 | Imaeda et al. | |
| 2018/0082787 A1* | 3/2018 | Hamamori | H01G 4/005 |
| 2018/0182555 A1 | 9/2018 | Kowase | |

FOREIGN PATENT DOCUMENTS

| | | |
|---|---|---|
| JP | 5524715 B2 | 4/2014 |
| JP | 2015-19032 A | 1/2015 |
| JP | 2017-212276 A | 11/2017 |
| JP | 2018-107239 A | 7/2018 |
| KR | 10-2015-0010684 A | 1/2015 |
| KR | 10-2015-0011263 A | 1/2015 |

* cited by examiner

MULTILAYER CAPACITOR

CROSS-REFERENCE TO RELATED APPLICATION

This application claims benefit of priority to Korean Patent Application No. 10-2018-0138076 filed on Nov. 12, 2018 in the Korean Intellectual Property Office, the disclosure of which is incorporated herein by reference in its entirety.

TECHNICAL FIELD

The present disclosure relates to a multilayer capacitor.

BACKGROUND

A capacitor is an element that may store electricity therein, and when a voltage is applied to the capacitor in a state in which two electrodes are disposed to face each other, electricity is accumulated in the respective electrodes. When a direct current (DC) voltage is applied to the capacitor, current flows in the capacitor while an electrical charge is accumulated, but when the accumulation of the electricity is completed, the current does not flow in the capacitor. Meanwhile, when an alternating current (AC) voltage is applied to the capacitor, an AC current flows in the capacitor while polarities of the electrodes are alternated.

Such a capacitor may be divided into several types of capacitor such as an aluminum electrolytic capacitor, in which electrodes are formed of aluminum and a thin oxide layer is disposed between the electrodes formed of aluminum, a tantalum capacitor, in which tantalum is used as an electrode material, a ceramic capacitor, in which a dielectric material having a high dielectric constant, such as a barium titanate, is used between electrodes, a multilayer ceramic capacitor (MLCC), in which a ceramic having a high dielectric constant is used in a multilayer structure as a dielectric material provided between electrodes, a film capacitor in which a polystyrene film is used as a dielectric material provided between electrodes, and the like, depending on a kind of insulator provided between electrodes.

Thereamong, the multilayer ceramic capacitor has recently mainly been used in various fields such as a high frequency circuit, and the like, since it has excellent temperature characteristics and frequency characteristics and may be implemented to have a small size.

A multilayer ceramic capacitor according to the related art includes a laminate formed by stacking a plurality of dielectric sheets and external electrodes formed on external surfaces of the laminate and having different polarities, wherein internal electrodes alternately stacked in the laminate may be electrically connected to the respective external electrodes.

Recently, in accordance with miniaturization and an increase in a degree of integration of an electronic product, many studies of miniaturization and an increase in a degree of integration of the multilayer ceramic capacitor have been conducted. Particularly, in the multilayer ceramic capacitor, various attempts at increasing the number of stacked dielectric layers and improving the connectivity of internal electrodes by decreasing thicknesses of the dielectric layers in order to increase a capacitance of the multilayer ceramic capacitor and miniaturize the multilayer ceramic capacitor have been conducted.

Particularly, in developing a multilayer ceramic capacitor having ultrahigh capacitance, it has become more important to secure reliability of a product in which the numbers of stacked thin film dielectric layers and internal electrodes are high. As the numbers of stacked dielectric layers and internal electrodes are increased, steps due to thickness differences between the internal electrodes and the dielectric layers are increased. These steps cause a warpage phenomenon in distal end portions of the internal electrodes due to stretching of the dielectric layers in a transversal direction in a densifying process of compressing a body.

For example, the distal end portions of the internal electrodes are bent in order to fill the steps, and in margin portions, empty spaces due to the steps are removed by depression of covers and a reduction in a margin width. The empty spaces due to the steps are removed, such that capacitance layers are also stretched by the reduced margin width. Reliability of the multilayer ceramic capacitor such as withstand voltage characteristics or the like may be reduced due to structurally irregular stretching of the internal electrodes as described above.

In order to solve such a problem, a method of cutting opposite end surfaces of the body in a length direction and then attaching end surface margin portions to the opposite end surfaces has been developed. However, such a method may be complicated, such that productivity may be low, and when the end surface margin portions are formed to have a small thickness, a thickness of corner margin portions also becomes small, such that moisture resistance reliability of the body is deteriorated.

SUMMARY

An aspect of the present disclosure is to provide a multilayer capacitor in which an effective volume may be significantly increased and moisture resistance reliability may be secured.

According to an aspect of the present disclosure, a multilayer capacitor includes a body including a stacked structure having a plurality of dielectric layers, and a plurality of internal electrodes stacked with the plurality of dielectric layers interposed therebetween, and external electrodes disposed on external surfaces of the body and electrically connected to the plurality of internal electrodes. The body has a central portion, and cover portions disposed above and below the central portion in a stacking direction of the plurality of dielectric layers, the body has a first surface and a second surface from which the plurality of internal electrodes are exposed and which oppose each other, a third surface and a fourth surface which oppose each other in the stacking direction of the plurality of dielectric layers, and a fifth surface and a sixth surface which are connected to the first to fourth surfaces and oppose each other, and a surface roughness of each of the third to sixth surfaces of the body is greater than a surface roughness of each of the first and second surfaces of the body.

In an aspect of the present disclosure, the surface roughness, Ra, of each of the third to sixth surfaces may satisfy the following relationship, based on an average calculation method: $0.2<Ra<0.6$.

In an aspect of the present disclosure, the surface roughness, Rt, of each of the third to sixth surfaces may satisfy the following relationship, based on a maximum height calculation method: $2.0<Rt<5.0$.

In an aspect of the present disclosure, the surface roughness, Rz, of each of the third to sixth surfaces may satisfy the following relationship, based on a ten-point average calculation method: $2.0<Rz<5.0$.

In an aspect of the present disclosure, corners of the cover portions in the body may be formed as curved surfaces.

In an aspect of the present disclosure, a radius R of curvature of each of the curved corners and a thickness T of the body may satisfy the following relationship: $10\ \mu m \leq R \leq T/4$.

In an aspect of the present disclosure, a margin Wg of each of the fifth and sixth surfaces from each of the fifth and sixth surfaces to an internal electrode closest to the surface of the body among the plurality of internal electrodes, and a margin Tg of each of the third and fourth surfaces from each of the third and fourth surfaces to an internal electrode closest to the surface of the body among the plurality of internal electrodes, may satisfy the following relationship: $0.8 \leq Tg/Wg \leq 1.2$.

In an aspect of the present disclosure, corners at which the third surface is connected to the fifth and sixth surfaces, and corners at which the fourth surface is connected to the fifth and sixth surfaces, may have curved surfaces in the cover portions.

In an aspect of the present disclosure, a margin δ of each of the corners having the curved surfaces in the cover portions may be greater than or equal to a margin Wg of each of the fifth and sixth surfaces.

In an aspect of the present disclosure, the margins (δ and Wg) may satisfy the following relationship: $1 \leq \delta/Wg \leq 1.2$.

In an aspect of the present disclosure, the plurality of internal electrodes may have a uniform width.

In an aspect of the present disclosure, in the plurality of internal electrodes, a width of an internal electrode disposed in the cover portion may be narrower than a width of an internal electrode disposed in the central portion.

In an aspect of the present disclosure, a width of the internal electrode disposed closer to the surface of the body, among the plurality of internal electrodes disposed in the cover portion, may be narrower.

In an aspect of the present disclosure, widths of the plurality of internal electrodes may be widths in a direction perpendicular to a direction connecting the first surface and the second surface, and widths in a direction perpendicular to the stacking direction of the plurality of dielectric layers.

According to an aspect of the present disclosure, a multilayer capacitor includes a body including: a stacked structure having dielectric layers, and first and second internal electrodes stacked with the dielectric layers interposed therebetween and respectively exposed from end surfaces of the body, and a margin covering the stacked structure except the end surfaces; and first and second external electrodes disposed on the end surfaces of the body and electrically connected to the first and second internal electrodes, respectively. A surface roughness of the margin is greater than a surface roughness of each of the end surfaces, and opposing ends of each of the first and second internal electrodes, in a width direction of the body, are in contact with the margin.

In an aspect of the present disclosure, the first and second internal electrodes may include, central internal electrodes, upper internal electrodes, and lower internal electrodes, the central internal electrodes may be disposed between the upper internal electrodes and the lower internal electrodes, a difference between a largest width and a smallest width of the central internal electrodes may be less than 0.1 μm, a width of the upper internal electrodes may decrease in a direction from the central internal electrodes to the upper internal electrodes, and a width of the lower internal electrodes may decrease in a direction from the central internal electrodes to the lower internal electrodes.

In an aspect of the present disclosure, a difference between a largest width and a smallest width of the internal electrodes may be less than 0.1 μm, and a distance, in a stacking direction of the dielectric layers, from an uppermost inner electrode of the first and second internal electrodes to an exterior upper surface of the margin, or a distance, in the stacking direction of the dielectric layers, from a lowermost inner electrode of the first and second internal electrodes to an exterior lower surface of the margin, may be greater than a distance, in the width direction of the body, from each of the first and second internal electrodes to an exterior side surface of the margin.

In an aspect of the present disclosure, one of the following conditions is satisfied: $0.2\ \mu m < Ra < 0.6\ \mu m$, in which Ra is the surface roughness of margin based on an average calculation method, $2.0\ \mu m < Rt < 5.0\ \mu m$, in which Rt is the surface roughness of margin based on a maximum height calculation method, and $2.0\ \mu m < Rz < 5.0\ \mu m$, in which Rz is the surface roughness of margin based on a ten-point average calculation method.

In an aspect of the present disclosure, the margin may include a plurality of layers each having pores.

In an aspect of the present disclosure, a thickness of a curved portion of the margin at a corner of the body may be equal to greater than a thickness of a flat portion of the margin disposed on a side surface of the body in the width direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
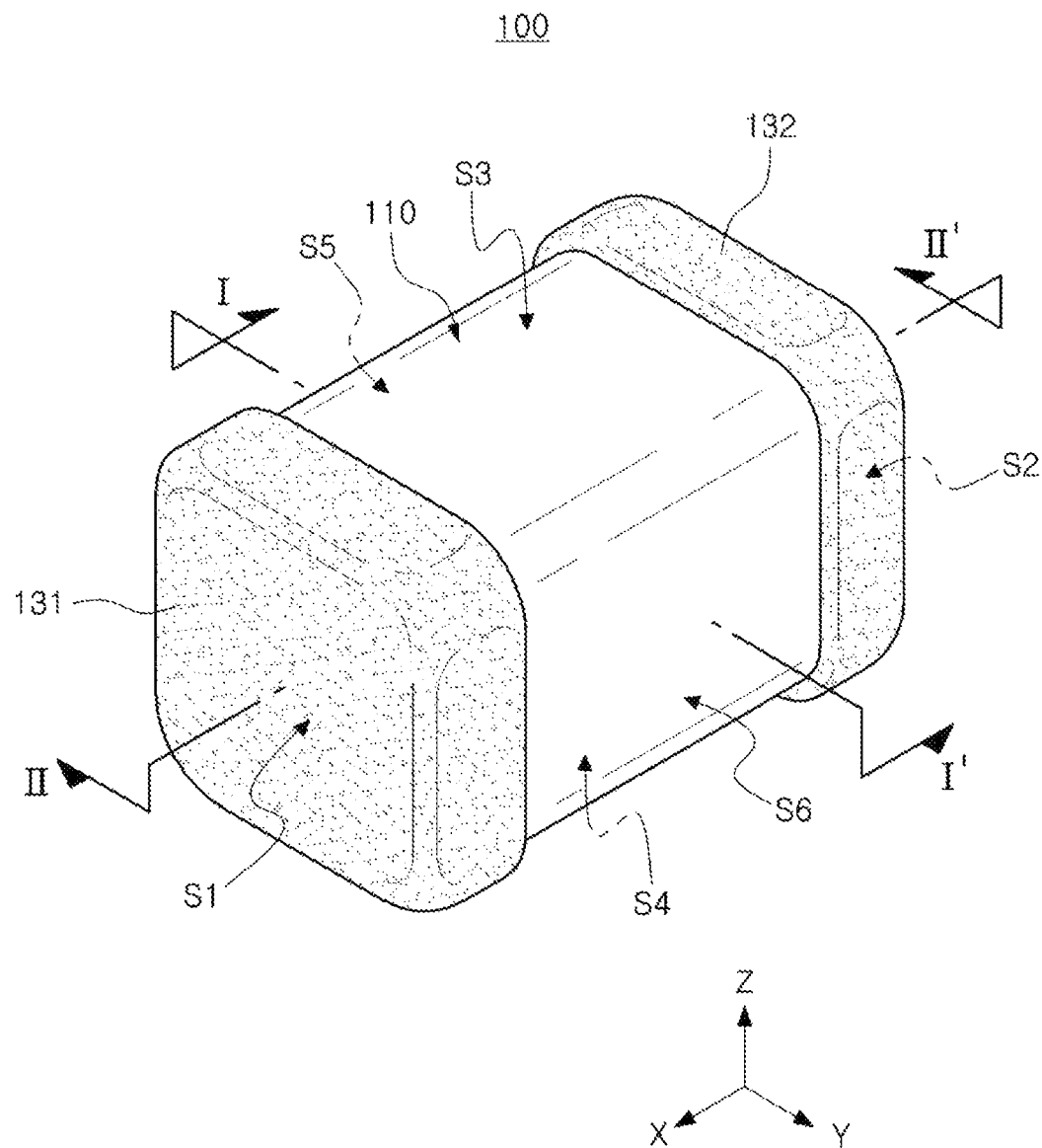
FIG. 1 is a schematic perspective view illustrating an appearance of a multilayer capacitor according to an embodiment in the present disclosure.

Hereinafter, embodiments of the present disclosure will be described as follows with reference to the attached drawings. However, embodiments of the present disclosure may be modified into various other forms, and the scope of the present disclosure is not limited to the embodiments described below. Embodiments of the present disclosure may be also provided to more fully describe the present disclosure to those skilled in the art. Therefore, the shapes and sizes of the elements in the drawings may be exaggerated for clarity, and the elements denoted by the same reference numerals in the drawings are the same elements.

In order to clearly illustrate the present disclosure, parts not related to the description are omitted, and thicknesses are enlarged in order to clearly represent layers and regions, and similar portions are denoted by similar reference numerals throughout the specification. Throughout the specification, when an element is referred to as "comprising", it means that it may include other elements as well, rather than excluding other elements unless specifically stated otherwise.

Figure 2:
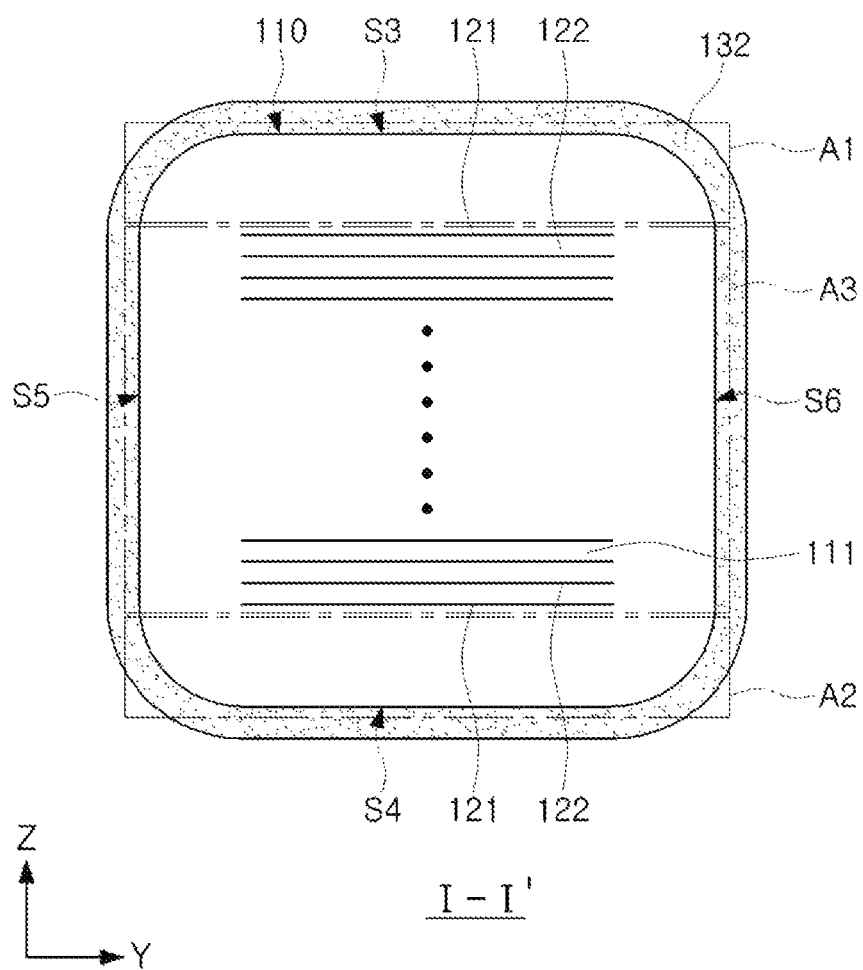
FIG. 2 is a cross-sectional view taken along line I-I' of the multilayer capacitor of FIG. 1.
Figure 3:
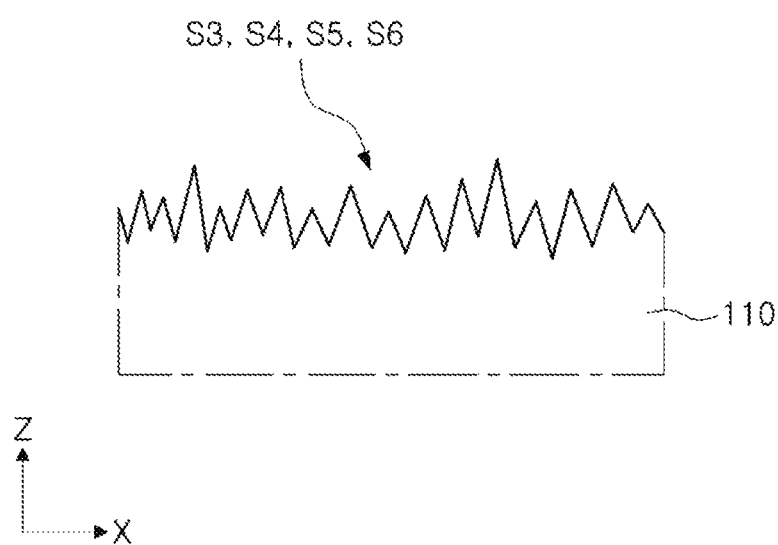
FIG. 3 is a schematic view illustrating a surface roughness of the third to sixth surfaces among the bodies of the multilayer capacitor of FIG. 1.
Figure 4:
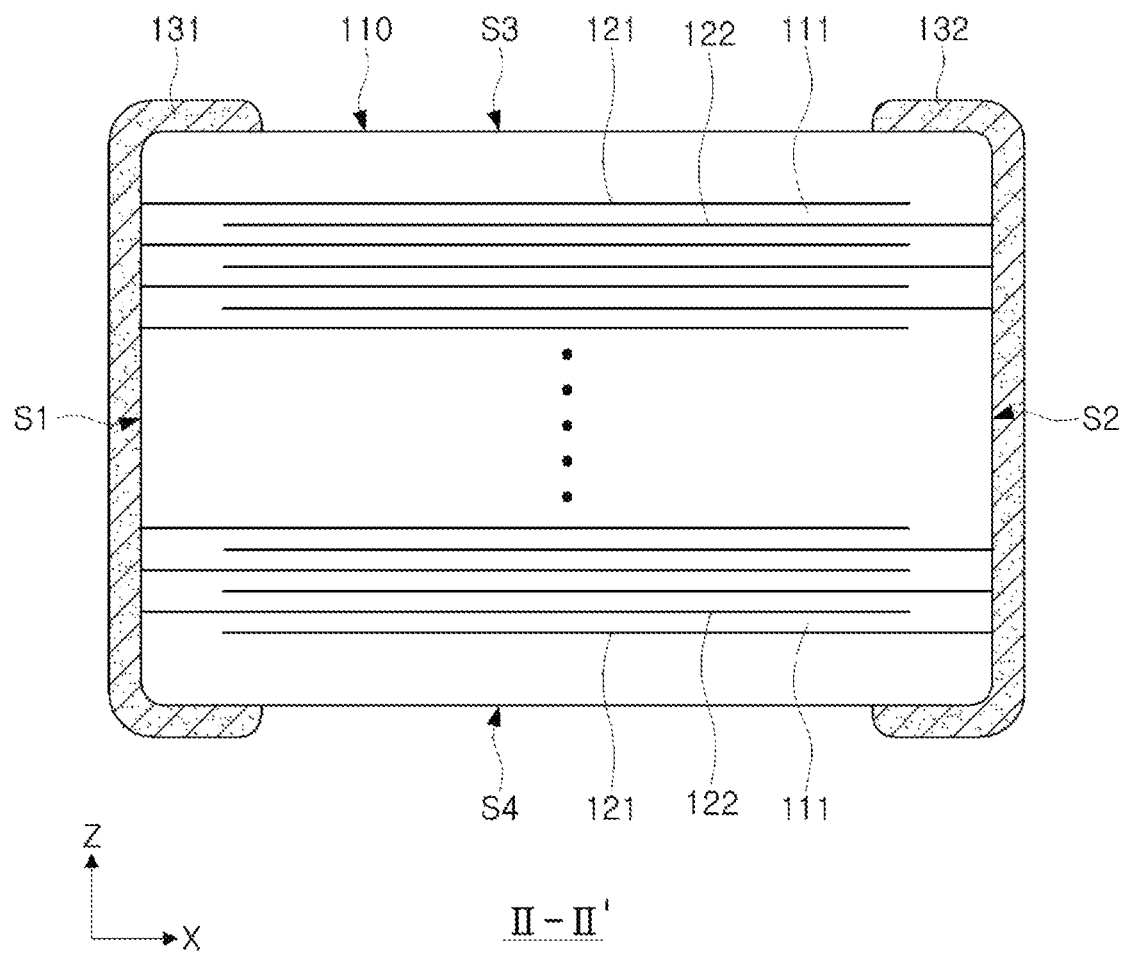
FIG. 4 is a cross-sectional view taken along line II-II' of the multilayer capacitor of FIG. 1.
Figure 5:
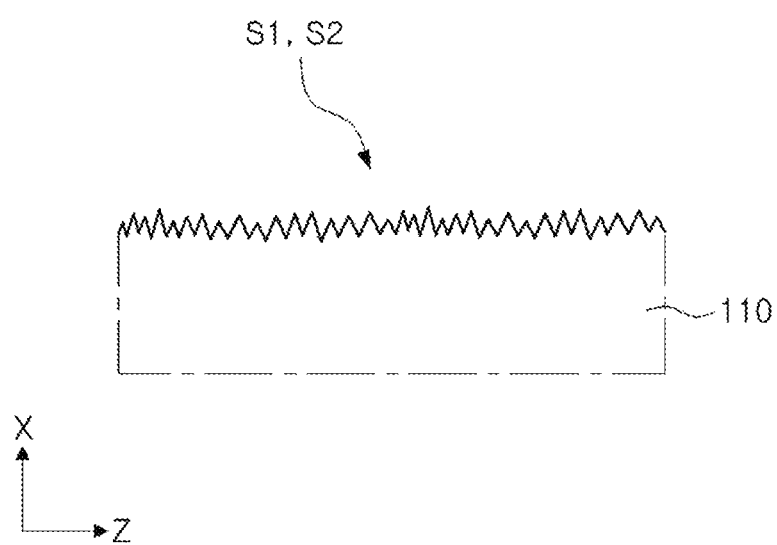
FIG. 5 is a schematic view illustrating a surface roughness of the first and second surfaces among the bodies of the multilayer capacitor of FIG. 1.
Figure 6:
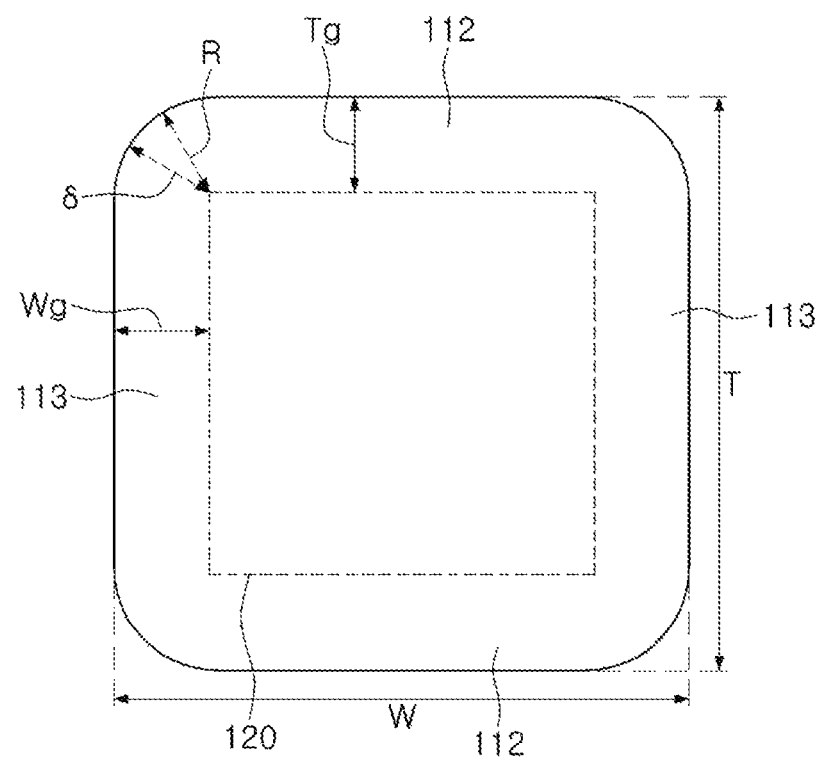
FIG. 6 is a cross-sectional view taken along line I-I' of the multilayer capacitor of FIG. 1, in which edges of a region of internal electrodes are denoted by dotted lines.

FIG. 1 is a schematic perspective view illustrating an appearance of a multilayer capacitor according to an embodiment in the present disclosure. FIGS. 2 and 6 are cross-sectional views taken along line I-I' of the multilayer capacitor of FIG. 1, and in FIG. 6, an outer side of a region in which internal electrodes are disposed is denoted by dotted lines. FIG. 3 is a schematic view illustrating a surface roughness of the third to sixth surfaces among the bodies of the multilayer capacitor of FIG. 1. FIG. 4 is a cross-sectional view taken along line II-II' of the multilayer capacitor of FIG. 1. FIG. 5 is a schematic view illustrating a surface roughness of the first and second surfaces among the bodies of the multilayer capacitor of FIG. 1.

Referring to the drawings, a multilayer capacitor 100 according to an embodiment of the present disclosure may include a body 110 including dielectric layers 111 and a plurality of internal electrodes 121 and 122 stacked with each of the dielectric layers 111 interposed therebetween, and external electrodes 131 and 132. In this case, as will be described later, corners of cover portions A1 and A2 of the body 110 may be formed as curved surfaces.

The body 110 may have a form in which the plurality of dielectric layers 111 are stacked, and may be obtained by stacking and then sintering, for example, a plurality of green sheets. The plurality of dielectric layers 111 may have a form in which they are integrated with one another by such a sintering process. A shape and a dimension of the body 110 and the number of stacked dielectric layer 111 are limited to those illustrated in the present embodiment, and the body 110 may have a shape similar to a rectangular parallelepiped shape, for example, as in a form illustrated in FIG. 1. The body 110 may include a first surface S1 and a second surface S2 to which the internal electrodes 121 and 122 are exposed, respectively, a third surface S3 and a fourth surface S4 opposing each other in a stacking direction (Z direction) of the plurality of dielectric layers 111, and a fifth surface S5 and a sixth surface S6 connected to the first to fourth surfaces S1, S2, S3, and S4 and opposing each other.

The dielectric layer 111 included in the body 110 may include a ceramic material having a high dielectric constant, for example, a BT-based ceramic material, for example, barium titanate ($BaTiO_3$)-based ceramic material, but may include another material known in the related art as long as a sufficient capacitance may be obtained. The dielectric layer 111 may further include an additive, an organic solvent, a plasticizer, a binder, a dispersant, and the like, as necessary, together with the ceramic material, which is a main component. In this case, the additives may include a metal component, and may be added in a metal oxide form in a manufacturing process. An example of such a metal oxide additive may include at least one of $MnO_2$, $Dy_2O_3$, $BaO$, $MgO$, $Al_2O_3$, $SiO_2$, $Cr_2O_3$, and $CaCO_3$.

In the present embodiment, as compared in FIGS. 3 and 5, a surface roughness of each of the third to sixth surfaces S3 to S6 may be greater than a surface roughness of each of the first and second surfaces S1 and S2. The third to sixth surfaces S3 to S6 may be obtained by forming a coating layer on the outer surface in such a manner that ceramic slurry is coated as described later with respect to the manufacturing method of the body 110. The inventors of the present disclosure have confirmed that such a method may be higher than a method of stacking ceramic green sheets, in view of a surface roughness of the body 110. Since the body 110 has a high surface roughness, the bonding strength with the external electrodes 131 and 132 may be improved, which may lead to enhancement of moisture resistance reliability of the body 110 and the like. In the case of the first and second surfaces S1 and S2, a surface grinding process for exposing the internal electrodes 121 and 122 and the like may be applied, such that the surface roughness may be relatively low.

For example, the surface roughness of each of the third to sixth surfaces S3 to S6 may satisfy the following relationship of Ra, based on an average calculation method: $0.2<Ra<0.6$. In this case, the average calculation method (unit: μm) may be one standard for calculating the surface roughness used in the related art, and may be obtained by averaging the roughness on the sampled surface with respect to the center line.

Further, as another reference of the surface roughness, the surface roughness of the third to sixth surfaces S3 to S6 may satisfy the following relationship of Rt, based on a maximum height calculation method: $2.0<Rt<5.0$. The maximum height calculation method (unit: μm) may be also one standard for calculating the surface roughness used in the related art, and may be obtained from the roughness at the farthest from the center line, after defining the sample section.

As another reference of the surface roughness, the surface roughness of the third to sixth surfaces S3 to S6 may satisfy the following relationship of Rz, based on a ten-point average calculation method: $2.0<Rz<5.0$. The ten-point average calculation method (unit: μm) may be also one standard for calculating the surface roughness used in the related art, and may be values obtained by adding the sum (absolute value) of the five distances farthest from the center line of the sample section in an upward direction and the sum (absolute value) of the five distances farthest from the center line of the sample section in an downward direction, and dividing the added sum by 5.

Each of the plurality of internal electrodes 121 and 122 may be obtained by printing and then sintering a paste including a conductive metal at a predetermined thickness on one surface of the ceramic green sheet. In this case, the plurality of internal electrodes 121 and 122 may include first and second internal electrodes 121 and 122 exposed, respectively, to the first surface S1 and the second surface S2 of the body 110 opposing each other, as in a form illustrated in FIG. 3. In this case, the first and second internal electrodes 121 and 122 may be connected to different external electrodes 131 and 132, respectively, to have different polarities when the multilayer capacitor is driven, and may be electrically separated from each other by each of the dielectric layers 111 disposed therebetween. As in an illustrated form, the plurality of internal electrodes 121 and 122 may have a uniform width. According to another embodiment, the number of external electrodes 131 and 132 and a connection manner of the internal electrodes 121 and 122 may be changed. An example of a main material constituting the internal electrodes 121 and 122 may include nickel (Ni), copper (Cu), palladium (Pd), silver (Ag), or the like, or alloys thereof.

The external electrodes 131 and 132 may include first and second external electrodes 131 and 132 formed on external surfaces of the body 110 and electrically connected, respectively, to the first and second internal electrodes 121 and 122. The external electrodes 131 and 132 may be formed by a method of manufacturing a material including a conductive metal in a form of a paste and then applying the paste to the body 110, and an example of the conductive metal may include nickel (Ni), copper (Cu), palladium (Pd), gold (Au), or alloys thereof. In addition, the external electrodes 131 and 132 may further include plating layers, as necessary, to mount the multilayer capacitor 100 on a substrate.

In the present embodiment, corners of the body 110 may be formed as curved surfaces to suppress a chipping defect. In addition, structural characteristics of the body 110 according to the present embodiment may be expressed unlike those described above. In detail, if a distance from a surface of the body 110 to an internal electrode closest to the surface of the body 110 among the plurality of internal electrodes 121 and 122 refers to a margin, a margin of each of the corners formed as the curved surfaces in the cover portions A1 and A2 may be greater than or equal to a margin of the body 110 in a width direction, which will be described below.

In the present embodiment, a size of the margin, a radius of curvature of the curved surface, a thickness, a distance, and the like, in the body 110 may be optimized in order to improve performance of the multilayer capacitor. Due to having such a structure, the multilayer capacitor 100 may have a high level of capacitance in spite of being miniaturized, and furthermore, may have improved moisture resistance reliability. This will hereinafter be described in detail.

The body 110 may be divided into the central portion A3 and the cover portions A1 and A2. In this case, the central portion A3 may correspond to a region forming a capacitance by the plurality of internal electrodes 121 and 122 disposed therein. The cover portions A1 and A2 may be disposed on upper and lower surfaces of the central portion A3, respectively, in the stacking direction (the Z direction in the drawings) of the plurality of dielectric layers 111. According to an embodiment, the internal electrodes 121 and 122 may be disposed in the cover portions A1 and A2.

As described above, in the cover portions A1 and A2 of the body 110, the corners may be formed as the curved surfaces, which may serve to reduce the chipping defect of the multilayer capacitor 100, and the like. In detail, in the cover portions A1 and A2, corners (upper curved surface corners in FIG. 2) at which the third surface S3 is connected to the fifth surface S5 and the sixth surface S6, and corners (lower curved surface corners in FIG. 2) at which the fourth surface S4 is connected to the fifth surface S5 and the sixth surface S6 may be formed as curved surfaces.

Referring to FIG. 6, optimal conditions of the size of the margin and the radius of curvature, the thickness, the length, and the like, of the curved surface in the body 110 will be described. In FIG. 6, a region in which the internal electrodes are disposed is defined as an internal electrode region 120 and is denoted by dotted lines. In this case, a Z direction refers to a thickness direction of the body 110, a Y direction refers to a width direction of the body 110, and T and W refer to a thickness and a width of the body 110, respectively.

First, a margin of the body 110 may be defined as a distance from the surface of the body to the internal electrode closest to the surface of the body among the plurality of internal electrodes. In detail, a margin of each of the corners formed as the curved surfaces in the cover portions A1 and A2 may be δ. In addition, a margin of each of the fifth surface S5 and the sixth surface S6 may be Wg, which corresponds to a margin of the body 110 in the width direction. In the present embodiment, the margin δ of the curved surface corner may be greater than or equal to the margin Wg of the body in the width direction. In the related art, the internal electrodes were not aligned with each other, such that it was difficult to form the margin of the body in the width direction. In order to solve such a problem, a process of separately forming the margin of the body in the width direction was used. In such a structure, it is difficult to sufficiently secure the margin δ of the curved surface corner of the body 110, and particularly in a case in which the body 110 is miniaturized and the number of stacked internal electrodes is increased, moisture resistance reliability may be deteriorated.

In the present embodiment, as described below, the corners of the body 110, more specifically, the corners of the cover portions A1 and A2 may be formed as the curved surfaces by a process of spraying a ceramic paste, which is more appropriate for forming margin regions in the body 110 having a low gradient form. Due to such a form, the margin δ of the curved surface corner may be sufficiently secured, and may be greater than or equal to the margin Wg of the body in the width direction. In more detail, $1 \leq \delta/Wg < 1.2$ in which δ is the margin of the curved surface corner and Wg is the margin of the body in the width direction. When the margin δ of the curved surface corner exceeds 1.2 times the margin Wg of the body in the width direction, widths of the internal electrodes 121 and 122 in the cover portions A1 and A2 may be significantly reduced, such that a capacitance may be reduced.

As the margin δ of the curved surface corner increases, the moisture resistance reliability may be improved even in the miniaturized body 110, and the body 110 may include a number of internal electrodes 121 and 122 to implement an improved capacitance. This means an increase in the capacitance, for example, an effective volume, when calculated on the basis of the same volume of the body 110.

In the present embodiment, the internal electrodes 121 and 122 disposed in the central portion A3 may have a uniform width. The uniform width of the internal electrodes 121 and 122 may be achieved by a process of dicing a ceramic laminate in individual chip units, as described below. In this case, uniformity of the width of the internal electrodes 121 and 122 may be determined on the basis of positions of end portions of the internal electrodes 121 and 122, and a deviation of the positions of the end portions of the internal electrodes 121 and 122 in the width direction (the Y direction) may be smaller than or equal to 0.1 μm.

In addition, $0.8 \leq Tg/Wg \leq 1.2$ in which Tg is a margin of the body 110 in the thickness direction, for example, a margin of each of the third surface S3 and the fourth surface S4, and Wg is the margin of the body in the width direction. As described above, the margin Tg of the body in the thickness direction and the margin Wg of the body in the width direction may be formed by the same process, and may thus have sizes similar to each other. When dielectric layers 111 corresponding to base layers for covers are formed on the uppermost and lowermost internal electrodes 121 and 122, respectively, the margin Tg of the body 110 in the thickness direction may be slightly greater than the margin Wg of the body in the width direction. Also, in this case, Tg/Wg may not exceed 1.2.

In addition, the margin Wg of the body in the width direction may satisfy the following relationship $0.5 \; \mu m \leq Wg \leq 15 \; \mu m$, and the margin Wg of the body in the width direction may be designed to secure the moisture resistance reliability of the body 110 and secure a sufficient capacitance. Likewise, the margin Tg of the body in the thickness direction may also satisfy the following relationship 0.5 µm≤Tg≤15 µm. In addition, the margin Wg of the body in the width direction may be set in consideration of the thickness T of the body 110, and specifically, 0.5 µm≤Wg≤T/12. In this case, the thickness T of the body 110 may be, for example, about 200 to 400 µm.

In addition, the radius R of curvature of each of the corners formed as the curved surfaces in the cover portions A1 and A2 may be designed to endure a weight of the multilayer capacitor 100 and chipping due to a load in a process, and specifically, 10 µm≤R≤60 µm. In addition, the radius R of curvature may be set in consideration of the thickness T of the body 110, and specifically, 10 µm≤R≤T/4. As described above, the thickness T of the body 110 may be, for example, about 200 to 400 µm. In addition, as in a form illustrated in FIG. 6, in the curved surface corners of the cover portions A1 and A2, the radius R of curvature and the margin δ may be the same as each other. In this case, the curved surface corner may correspond to a part of a spherical surface. The radius R of curvature and the margin δ may also be different from each other depending on a shape of each of the curved surface corners of the cover portions A1 and A2. For example, each of the curved surface corners of the cover portions A1 and A2 may be formed as an aspherical surface.

In the body 110, when outer regions surrounding the plurality of internal electrodes 121 and 122, for example, regions surrounding an internal electrode region 120 in FIG. 6 are margin regions 112 and 113, a packing factor of the dielectric layer 111 may be lower in the margin regions 112 and 113 than in the other regions. As described below, the margin regions 112 and 113 may be obtained in a manner of manufacturing and then coating a ceramic laminate, and a difference in the packing factor may be due to a difference in such a manufacturing manner. In this case, the packing factor may be understood as a concept that is inversely proportional to a density of pores existing in the dielectric layer.

Figure 7:
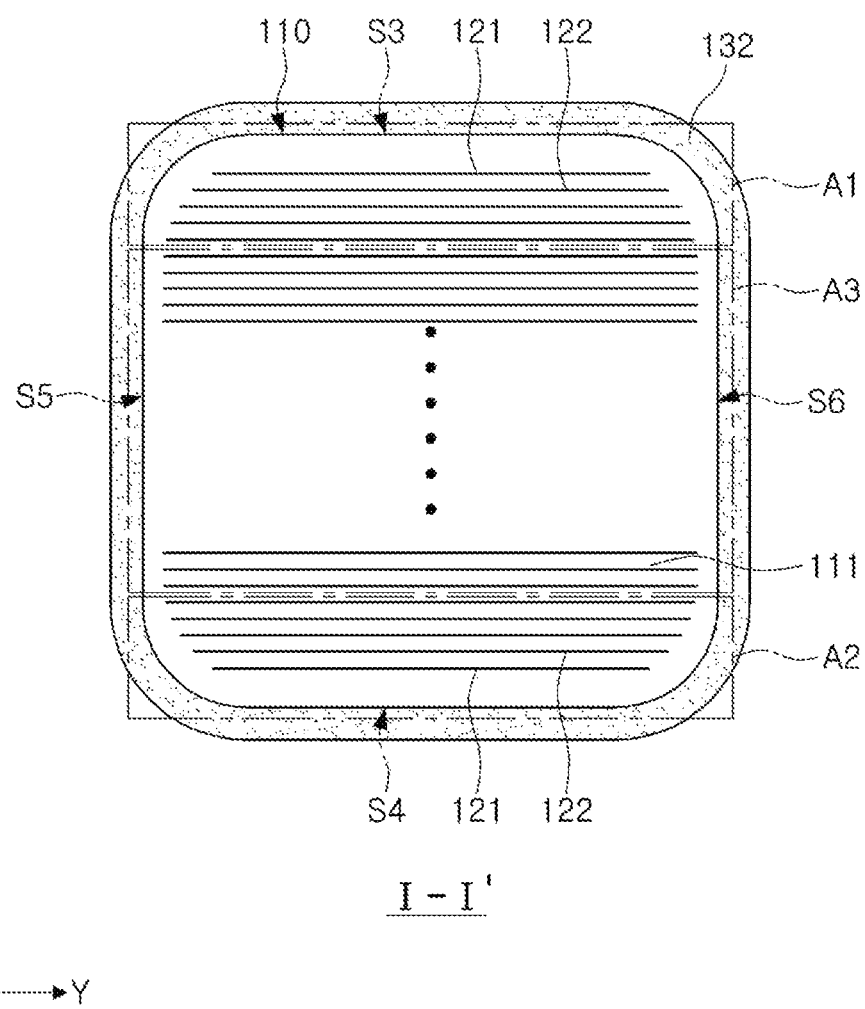
FIGS. 7 and 8 are views illustrating shapes of a body and an internal electrode that may be employed in a multilayer capacitor according to another embodiment of the present disclosure.
Figure 8:
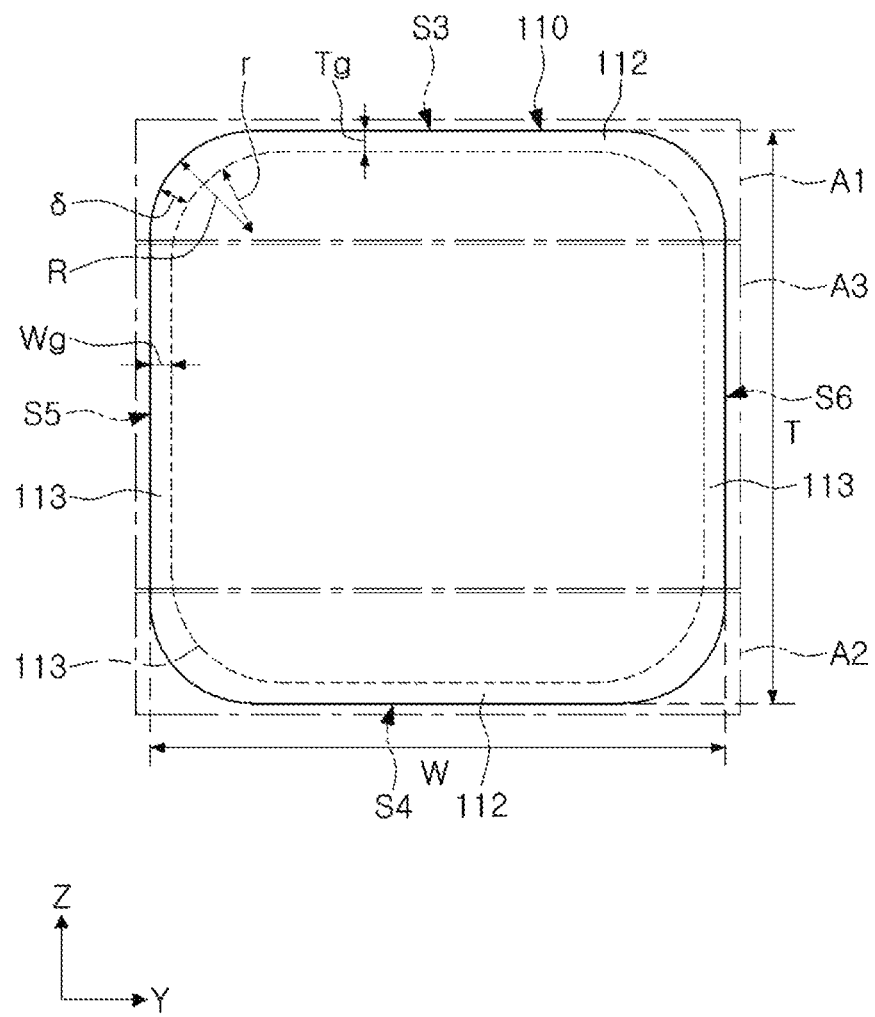

FIGS. 7 and 8 are views illustrating shapes of a body and an internal electrode that may be employed in a multilayer capacitor according to another embodiment of the present disclosure.

Referring to FIG. 7, a body 110 may be divided into a central portion A3 and cover portions A1 and A2. The cover portions A1 and A2 may be disposed on upper and lower surfaces of the central portion A3, respectively, in a stacking direction (a Z direction in the drawings) of the plurality of dielectric layers 111. Internal electrodes 121 and 122 may be disposed in the cover portions A1 and A2 and the central portion A3, and a width of an internal electrode disposed in the cover portions A1 and A2 may be narrower than a width of an internal electrode disposed in the central portion A3. In this case, as illustrated in the drawings, a width of an internal electrode, disposed closer to the surface of the body among the plurality of internal electrodes 121 and 122 disposed in the cover portions A1 and A2, is narrower. Widths of the plurality of internal electrodes 121 and 122 may be defined as widths in a direction perpendicular to the direction (the X direction) connecting the first surface S1 and the second surface S2, and as widths in a direction perpendicular to the stacking direction (the Z direction) of the plurality of dielectric layers 111, i.e., as widths in the Y direction.

As described above, in the cover portions A1 and A2 of the body 110, the corners may be formed as the curved surfaces, which may serve to reduce the chipping defect of the multilayer capacitor 100. In detail, in the cover portions A1 and A2, corners (upper curved surface corners in FIG. 2) at which the third surface S3 is connected to the fifth surface S5 and the sixth surface S6, and corners (lower curved surface corners in FIG. 2) at which the fourth surface S4 is connected to the fifth surface S5 and the sixth surface S6 may be formed as curved surfaces.

Referring to FIG. 8, optimal conditions of the size of the margin and the radius of curvature, the thickness, the length, and the like, of the curved surface in the body 110 will be described. In FIG. 6, a region in which the internal electrodes are disposed is defined as an internal electrode region 120 and is denoted by dotted lines. In this case, a Z direction refers to a thickness direction of the body 110, a Y direction refers to a width direction of the body 110, and T and W refer to a thickness and a width of the body 110, respectively.

First, a margin of the body 110 may be defined as a distance from the surface of the body to the internal electrode closest to the surface of the body among the plurality of internal electrodes. In detail, a margin of each of the corners formed as the curved surfaces in the cover portions A1 and A2 may be δ. In addition, a margin of each of the fifth surface S5 and the sixth surface S6 may be Wg, which corresponds to a margin of the body 110 in the width direction. In the present embodiment, the margin δ of the curved surface corner may be greater than or equal to the margin Wg of the body in the width direction. In the related art, the internal electrodes were not aligned with each other, such that it was difficult to form the margin of the body in the width direction. In order to solve such a problem, a process of separately forming the margin of the body in the width direction was used. In such a structure, it is difficult to sufficiently secure the margin δ of the curved surface corner of the body 110, and particularly in a case in which the body 110 is miniaturized and the number of stacked internal electrodes is increased, moisture resistance reliability may be deteriorated.

In the present embodiment, widths of the internal electrodes 121 and 122 disposed on the cover portions A1 and A2 may be adjusted to have a shape corresponding to the curved surface corner of the body 110 in a whole. Due to such a form, the margin δ of the curved surface corner may be sufficiently secured, and may be greater than or equal to the margin Wg of the body in the width direction. In more detail, 1≤δ/Wg≤1.2 in which δ is the margin of the curved surface corner and Wg is the margin of the body in the width direction. When the margin δ of the curved surface corner exceeds 1.2 times the margin Wg of the body in the width direction, widths of the internal electrodes 121 and 122 in the cover portions A1 and A2 may be significantly reduced, such that a capacitance may be reduced.

As the margin δ of the curved surface corner increases, the moisture resistance reliability may be improved even in the miniaturized body 110, and the body 110 may include a number of internal electrodes 121 and 122 to implement an improved capacitance. This means an increase in the capacitance, for example, an effective volume, when calculated on the basis of the same volume of the body 110.

In the present embodiment, the internal electrodes 121 and 122 disposed in the central portion A3 may have a uniform width. The uniform width of the internal electrodes 121 and 122 may be achieved by a process of dicing a ceramic laminate in individual chip units, as described below. In this case, uniformity of the width of the internal electrodes 121 and 122 may be determined on the basis of positions of end portions of the internal electrodes 121 and 122, and a deviation of the positions of the end portions of the internal electrodes 121 and 122 in the width direction (the Y direction) may be smaller than or equal to 0.1 µm.

In addition, $0.8 \leq Tg/Wg \leq 1.2$ in which Tg is a margin of the body 110 in the thickness direction, for example, a margin of each of the third surface S3 and the fourth surface S4, and Wg is the margin of the body in the width direction. As described above, the margin Tg of the body in the thickness direction and the margin Wg of the body in the width direction may be formed by the same process, and may thus have sizes similar to each other. When dielectric layers 111 corresponding to base layers for covers are formed on the uppermost and lowermost internal electrodes 121 and 122, respectively, the margin Tg of the body in the thickness direction may be slightly greater than the margin Wg of the body in the width direction. Also, in this case, Tg/Wg may not exceed 1.2.

In addition, the margin Wg of the body in the width direction may satisfy the following relationship $0.5 \text{ µm} \leq Wg \leq 15 \text{ µm}$, and the margin Wg of the body in the width direction may be designed to secure the moisture resistance reliability of the body 110 and secure a sufficient capacitance. Likewise, the margin Tg of the body in the thickness direction may also satisfy the following relationship $0.5 \text{ µm} \leq Tg \leq 15 \text{ µm}$. In addition, the margin Wg of the body in the width direction may be set in consideration of the thickness T of the body 110, and specifically, $0.5 \text{ µm} \leq Wg \leq T/12$. In this case, the thickness T of the body 110 may be, for example, about 200 to 400 µm.

In addition, the radius R of curvature of each of the corners formed as the curved surfaces in the cover portions A1 and A2 may be designed to endure a weight of the multilayer capacitor 100 and chipping due to a load in a process, and specifically, $10 \text{ µm} \leq R \leq 60 \text{ µm}$. In addition, the radius R of curvature may be set in consideration of the thickness T of the body 110, and specifically, $10 \text{ µm} \leq R \leq T/4$. As described above, the thickness T of the body 110 may be, for example, about 200 to 400 µm. In this case, a curved surface region of the internal electrode region 120 in the cover portions A1 and A2 may have a substantially curved shape, for example, substantially the same curvature as that of the corner of the body 110, and the curved surface region of the internal electrode region 120 may be an imaginary plane obtained by connecting the end portions of the internal electrodes 121 and 122 arranged in the cover portions A1 and A2 in the stacking direction. As illustrated in the drawings, corners formed by the imaginary plane of the internal electrode region 120 and the curved surface of the cover portions A1 and A2 may face each other.

Further, as illustrated in FIG. 8, in a case of an imaginary plane obtained by connecting the end portions of the internal electrodes 121 and 122 arranged in the cover portions A1 and A2 in the stacking direction, curvature radius r may be smaller than curvature radius R of a corner formed as a curved surface in the cover portions A1 and A2. In this case, the curvature radii r and R may share a center.

The curvature radius R of the curved corner of the cover portions A1 and A2 may be the same as those calculated by adding the curvature radius r of the imaginary plane to the margin δ of each of the corners formed by the curved surfaces of the cover portions A1 and A2.

An example of a manufacturing method will be described with reference to FIGS. 9 to 18 to more clearly understand the structure of the above-described multilayer capacitor.

Figure 9:
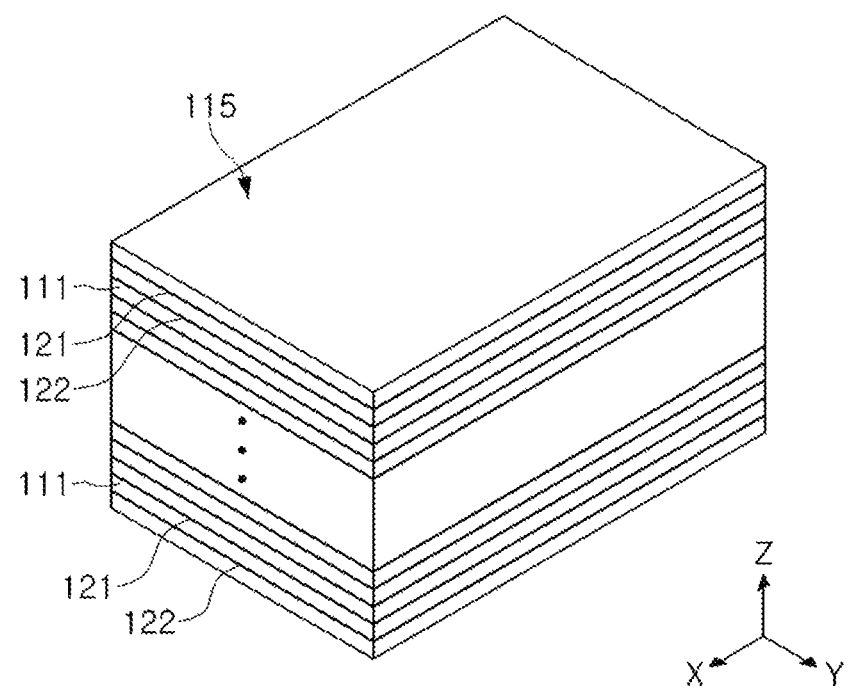
FIGS. 9 to 18 are views illustrating processes of manufacturing a multilayer capacitor according to an embodiment in the present disclosure.
Figure 10:
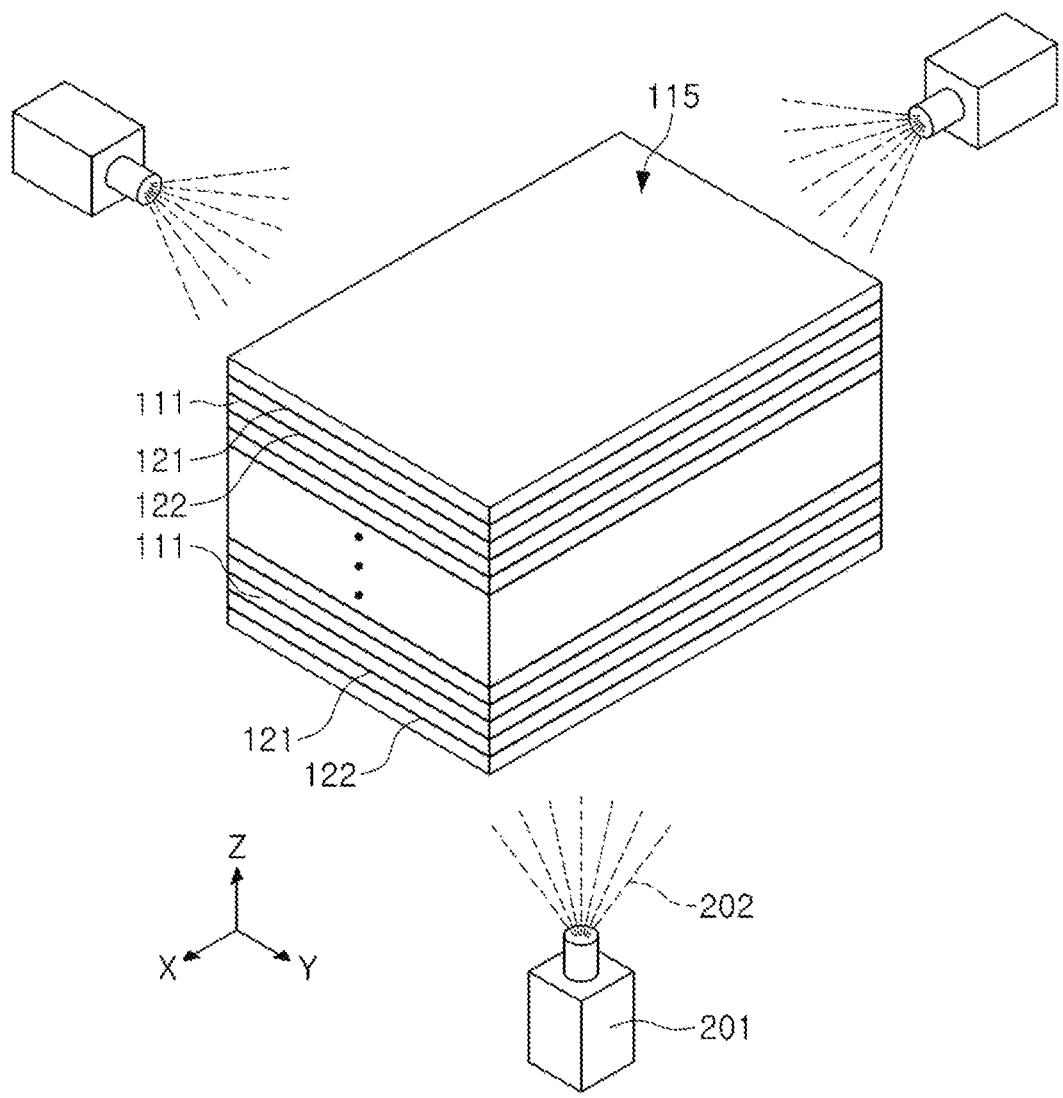

First, as in a form illustrated in FIG. 9, a ceramic laminate 115 may be prepared by stacking dielectric layers 111 and internal electrodes 121 and 122. In this case, since the dielectric layer 111 is in a state before being sintered, the dielectric layer 111 may be in a state of a ceramic green sheet. The ceramic green sheet may be manufactured by mixing ceramic powders, a binder, a solvent, and the like, with one another to prepare slurry, and manufacturing the slurry in a sheet shape having a thickness of several micrometers by a doctor blade method. Then, the ceramic green sheet may be sintered to form the dielectric layer 111.

A conductive paste for an internal electrode may be applied onto the ceramic green sheet to form an internal electrode pattern on the ceramic green sheet. In this case, the internal electrode pattern may be formed by a screen printing method or a gravure printing method. The conductive paste for an internal electrode may include a conductive metal and an additive. The additive may be one or more of a non-metal and a metal oxide. The conductive metal may include nickel. The additive may include barium titanate or strontium titanate as the metal oxide.

A plurality of ceramic green sheets on which the internal electrode patterns are formed may be stacked and pressed to implement a ceramic laminate 115. In this case, the ceramic laminate 115 may include the dielectric layers 111 as base layers for covers disposed at an uppermost portion and a lowermost portion thereof to effectively protect the internal electrodes 121 and 122. The dielectric layers 111 may not be disposed at the uppermost portion and the lowermost portion of the ceramic laminate 115.

After the ceramic laminate 115 is formed, the ceramic laminate 115 may be diced in individual chip units, as necessary. In this case, the internal electrodes 121 and 122 may be exposed in order to be connected to the external electrodes. The internal electrodes 121 and 122 exposed by a dicing process may have a uniform width. For example, a difference between the largest width and the smallest width of the internal electrodes 121 and 122 may be equal to or less than 0.1 µm.

Figure 11:
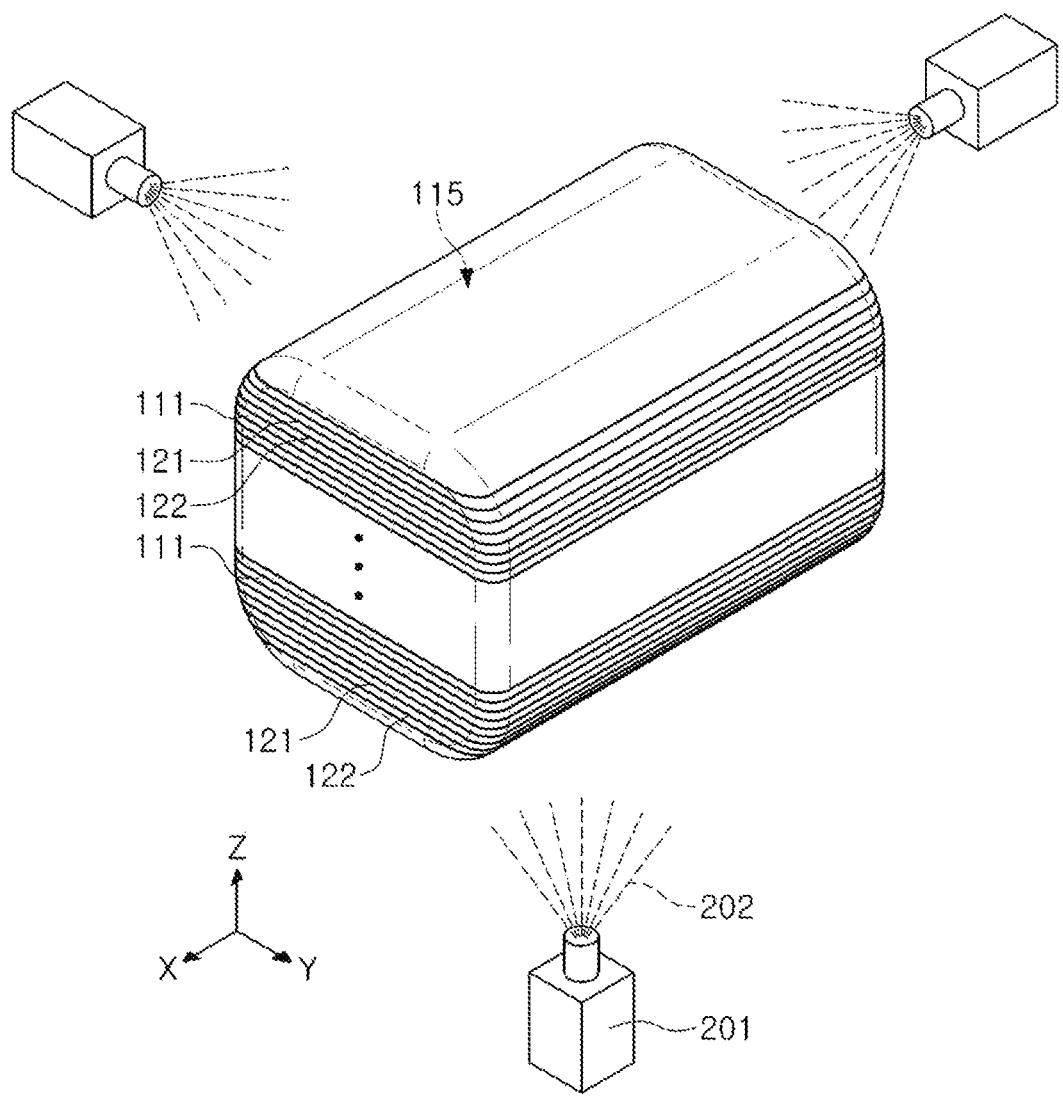
Figure 12:
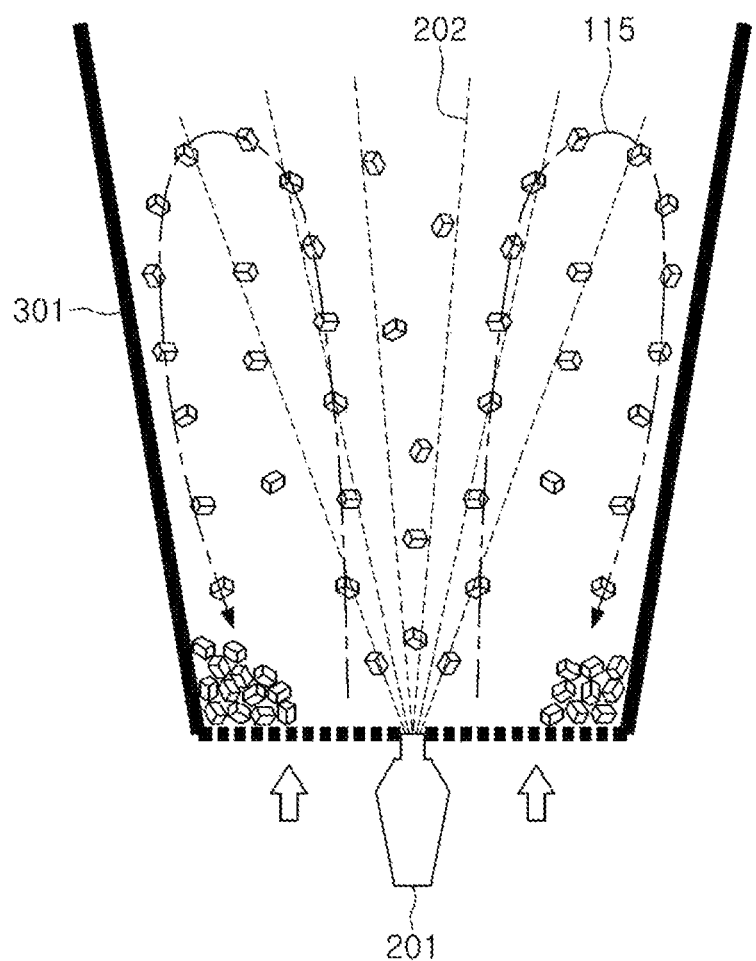
Figure 13:
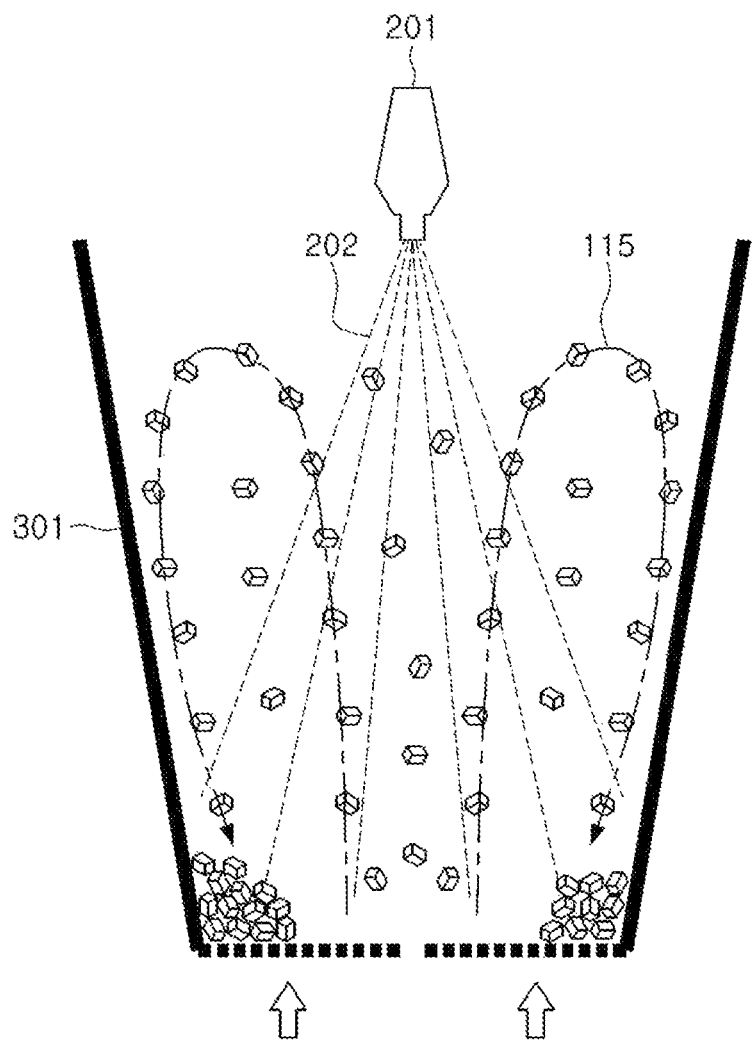

Then, coating layers 118 (see FIG. 15) may be formed on surfaces of the ceramic laminate 115. To this end, an appropriate coating operation may be performed. In the present embodiment, as in a form illustrated in FIG. 10, a method of spray-coating ceramic slurry 202 using a spray apparatus 201 may be used. In this case, the ceramic slurry 202 may further include the same component as that of the green sheet for forming the dielectric layer 111 or a component giving fluidity to the green sheet, for example, a liquid binder, or the like. FIG. 11 illustrates a process of manufacturing the multilayer capacitor according to the embodiments of FIGS. 7 and 8, and the coating operation may be the same as that of FIG. 10. In order to obtain the shapes of FIGS. 7 and 8, an operation of grinding the corner of the ceramic laminate 115 to have a curved surface may be further included. In this operation, the internal electrodes 121 and 122 arranged in the uppermost portion and the lowermost portion (corresponding to the cover portion of the above-described) may be ground together such that the internal electrodes 121 and 122 are exposed from the ceramic laminate 115. By the grinding operation, the plurality of internal electrodes 121 and 122, which may be arranged on the cover portion of the body, may be formed in a narrower width than that arranged in the central portion. In the grinding operation of the corners of the ceramic laminate 115, barrel grinding or the like may be used. The following description of the coating operation and subsequent operation(s) may be applied to the operation for obtaining the structures of FIGS. 7 and 8.

An example of the present coating operation will be described. First, as in forms illustrated in FIGS. 12 and 13, the ceramic laminates 115 may be disposed in a coating apparatus 301, and air currents (denoted by arrows in FIGS. 12 and 13) may be generated from a lower portion toward an upper portion in the coating apparatus 301. After the ceramic laminate 115 is floated in this manner, the ceramic slurry 202 may be sprayed to the ceramic laminate 115 through a nozzle of the spray apparatus 201 disposed on the lower portion (see FIG. 12) or the upper portion (see FIG. 13) of the coating apparatus 301. Unlike the forms illustrated therein, the spraying apparatus 201 may also be disposed on a side portion of the coating apparatus 301. The coating layers 118 having a uniform thickness may be formed on the surfaces of the ceramic laminates 115 in such a coating manner. The coating layers 118 are separately formed after the ceramic laminate 115 is manufactured, such that a margin region of the body may be uniformly and thinly formed, and a margin having a sufficient thickness in a corner region of the body having a poor moisture resistance performance may be obtained.

Figure 14:
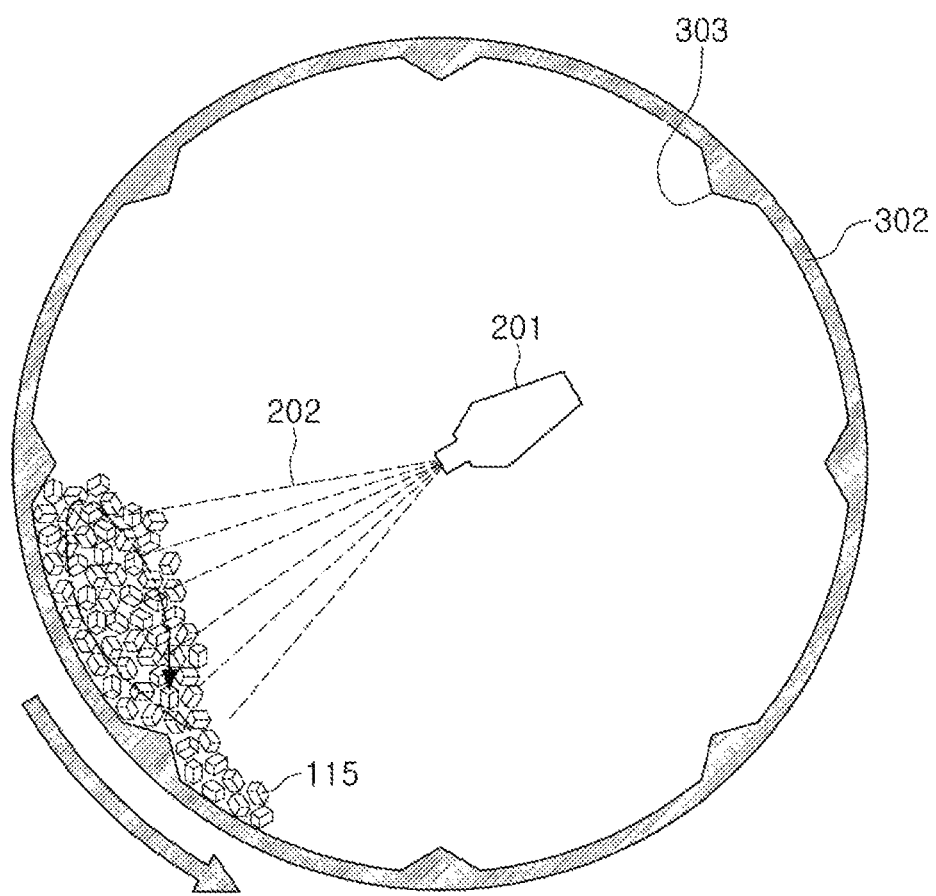

In addition, as another coating manner, as in a form illustrated in FIG. 14, a coating apparatus 302 having a spherical container form may be used. In this case, protrusions 303 may be formed on an inner side of the coating apparatus 302. The ceramic laminate 115 may be overturned and moved while the coating apparatus 302 is rotated. In this process, the ceramic laminate 115 may be uniformly coated.

Figure 15:
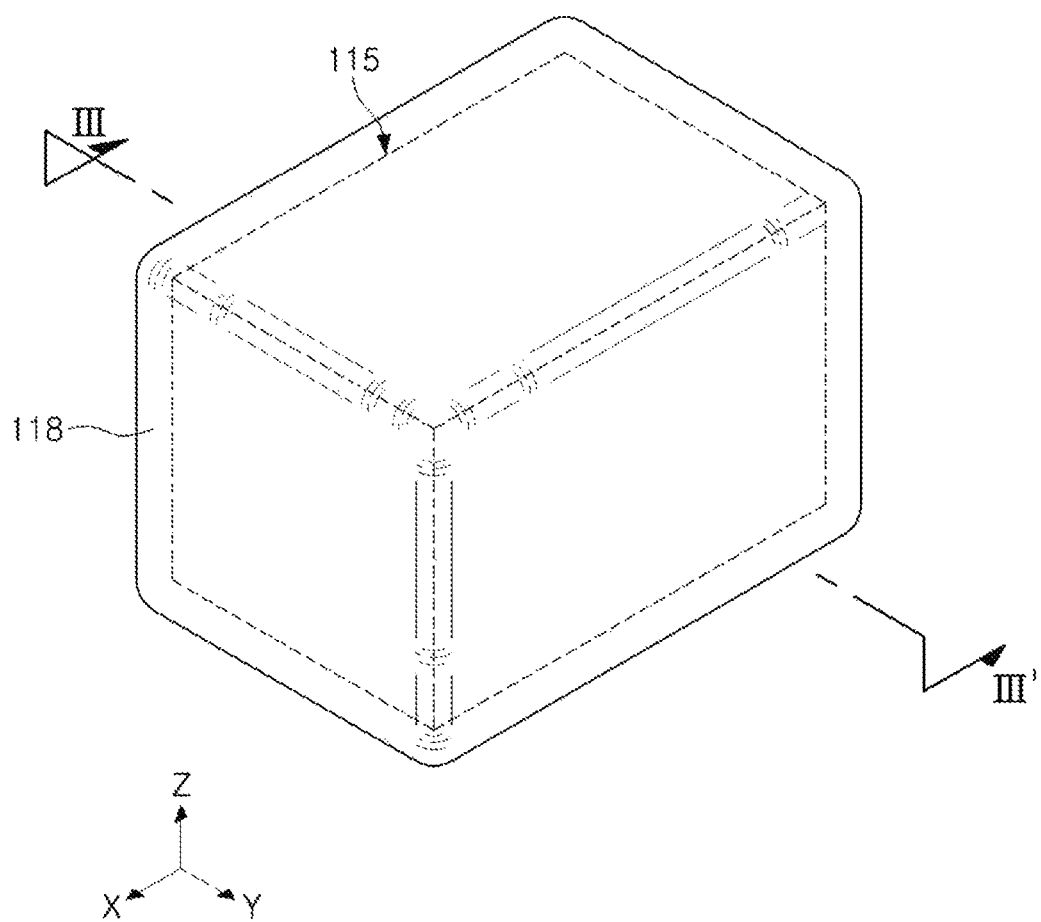
Figure 16:
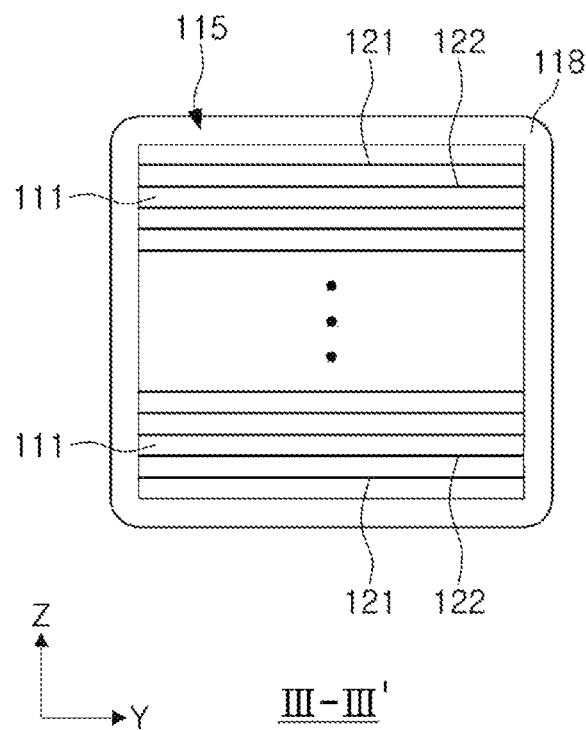

FIG. 15 is a view illustrating a state in which the coating layers 118 are formed on all the surfaces of the ceramic laminate 115, and FIG. 16 is a cross-sectional view taken along line III-III' of FIG. 15. As in a form illustrated therein, when the ceramic laminate 115 is subjected to the coating operation described above, corners of the coating layers 118 may have curved surfaces. Then, the ceramic laminate 115 may be sintered in a state in which the coating layers 118 are applied. Therefore, the ceramic green sheets included in the ceramic laminate 115 and the coating layers 118 may become an integral body. Further, as described above, the body obtained by the coating operation has a higher surface roughness than that obtained by the conventional stacking process.

Figure 17:
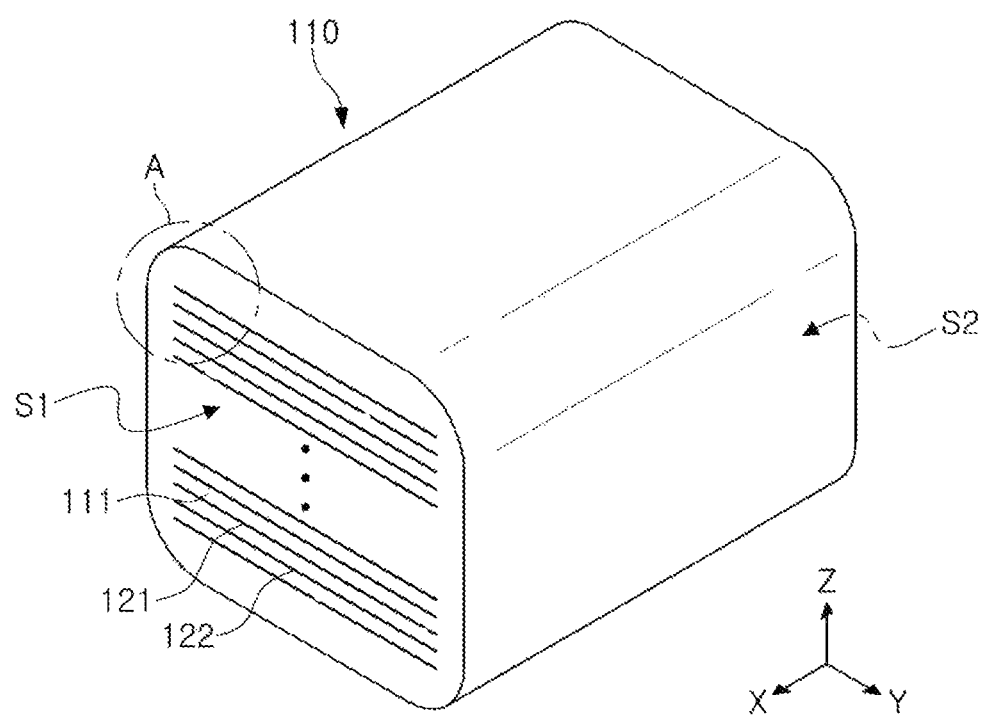

After a sintering process, a portion of the body 110 may be removed to expose the internal electrodes 121 and 122. In this case, surfaces of the body on which the internal electrodes 121 and 122 are exposed may correspond to the first surface S1 and the second surface S2 described with reference to FIG. 1. Other surfaces of the body may also be exposed, as necessary. As a surface grinding process of removing the portion of the body 110, a grinding process, or the like, may be used. FIG. 17 illustrates the body 110 subjected to the surface grinding process after the sintering process and the internal electrodes 121 and 121 exposed from the body 110. Then, external electrodes may be formed to be connected to the exposed internal electrodes 121 and 122.

Figure 18:
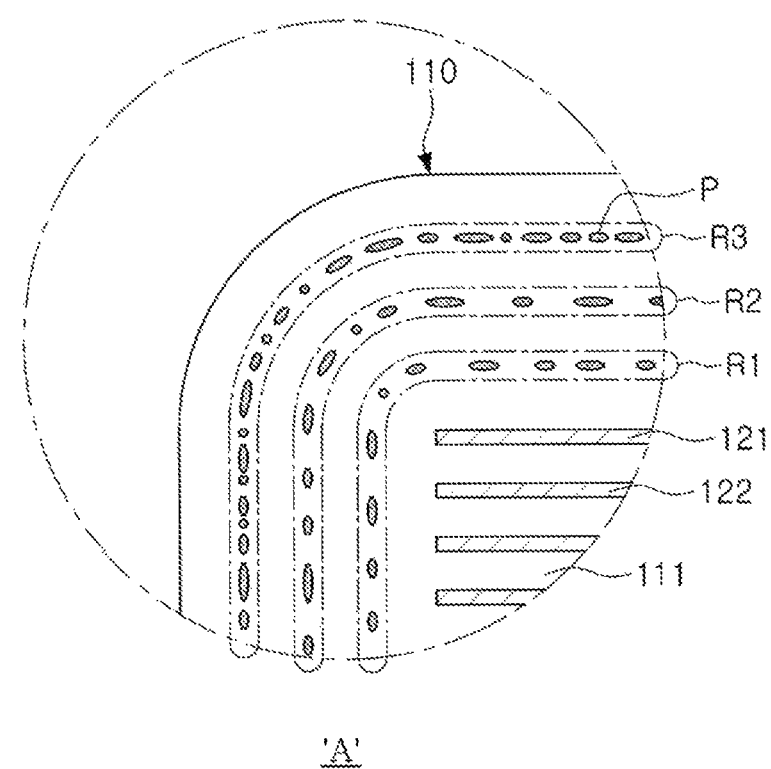

Meanwhile, in the process described above, the dielectric layer 111 may be formed of the ceramic green sheet, and margin regions may be formed by a coating operation by the spraying of the ceramic slurry. Therefore, there may be a difference in an internal structure of the body after the sintering process. For example, characteristics such as a packing factor or the like may be different between the internal electrode region 120 and the margin regions 112 and 113 of the body 110. This will be described with reference to FIG. 18. FIG. 18 is an enlarged plan view illustrating region A of FIG. 18.

When comparing a packing factor of the dielectric layer 111 between the margin regions and a region (for example, the internal electrode region) other than the margin regions in the body 110, the packing factor may be relatively lower in the margin regions 112 and 113 than in the region other than the margin regions. In addition, in the margin regions 112 and 113, a packing factor may be relatively higher in a region close to the internal electrodes 121 and 122 than in a region close to an outer portion of the body 110. For example, in the margin regions 112 and 113, the dielectric layers 111 may be at least two layers having different packing factors, and a packing factor of the dielectric layer 111 may be further higher in a layer, adjacent to the plurality of internal electrodes 121 and 122, of the at least two layers.

These packing factor characteristics of the margin regions 112 and 113 may be obtained by the coating operation described above. When the ceramic slurry is sprayed, several-fold thin coating layers may be formed on the surfaces of the ceramic laminate 115, and a plurality of pores may be formed between the coating layers and may remain even after the sintering process. As illustrated in FIG. 18, a plurality of needle-like pores P may remain in the margin regions 112 and 113 of the body 110. Since the plurality of needle-like pores P are generated in a process of forming the several-fold thin coating layers, a plurality of rows R1, R2, and R3 formed by the plurality of needle-like pores P may have a form in which they are aligned in a shape corresponding to an appearance of the body 110. Pore densities of the plurality of rows R1, R2, and R3 by the plurality of needle-like pores P may be different from one another, and as a region becomes closer to the surface of the body, the region may be later coated, and a pore density of the region may thus be relatively lower.

As set forth above, the multilayer capacitor according to the embodiment in the present disclosure may be advantageous in terms of miniaturization, may have a high capacitance, and may have excellent moisture resistance characteristics to have a high reliability.

According to an embodiment of the present disclosure, the multilayer capacitor may be advantageous in terms of miniaturization, may have a high capacitance, and may have excellent moisture resistance characteristics to have a high reliability. In addition, the bonding strength between the body and the external electrode may increase to improve the moisture resistance reliability.

While embodiments have been shown and described above, it will be apparent to those skilled in the art that modifications and variations could be made without departing from the scope of the present disclosure as defined by the appended claims.

What is claimed is:

1. A multilayer capacitor comprising:
   a body including a stacked structure having a plurality of dielectric layers, and a plurality of internal electrodes stacked with the plurality of dielectric layers interposed therebetween; and
   external electrodes disposed on external surfaces of the body and electrically connected to the plurality of internal electrodes,
   wherein the body has a central portion, and cover portions disposed above and below the central portion in a stacking direction of the plurality of dielectric layers,
   the body has a first surface and a second surface from which the plurality of internal electrodes are exposed and which oppose each other, a third surface and a fourth surface which oppose each other in the stacking direction of the plurality of dielectric layers, and a fifth surface and a sixth surface which are connected to the first to fourth surfaces and oppose each other, and a surface roughness of each of the third to sixth surfaces of the body is greater than a surface roughness of each of the first and second surfaces of the body.

2. The multilayer capacitor according to claim 1, wherein the surface roughness, Ra, of each of the third to sixth surfaces satisfies the following relationship, based on an average calculation method:

0.2 µm<Ra<0.6 µm.

3. The multilayer capacitor according to claim 1, wherein the surface roughness, Rt, of each of the third to sixth surfaces satisfies the following relationship, based on a maximum height calculation method:

2.0 µm<Rt<5.0 µm.

4. The multilayer capacitor according to claim 1, wherein the surface roughness, Rz, of each of the third to sixth surfaces satisfies the following relationship, based on a ten-point average calculation method:

2.0 µm<Rz<5.0 µm.

5. The multilayer capacitor according to claim 1, wherein corners of the cover portions in the body have curved surfaces.

6. The multilayer capacitor according to claim 5, wherein a radius R of curvature of each of the curved corners and a thickness T of the body satisfy the following relationship:

10 µm≤R≤T/4.

7. The multilayer capacitor according to claim 5, wherein, a margin Wg of each of the fifth and sixth surfaces from each of the fifth and sixth surfaces to an internal electrode closest to the surface of the body among the plurality of internal electrodes, and a margin Tg of each of the third and fourth surfaces from each of the third and fourth surfaces to an internal electrode closest to the surface of the body among the plurality of internal electrodes, satisfy the following relationship:

0.8≤Tg/Wg≤1.2.

8. The multilayer capacitor according to claim 5, wherein corners at which the third surface is connected to the fifth and sixth surfaces, and corners at which the fourth surface is connected to the fifth and sixth surfaces, have curved surfaces in the cover portions.

9. The multilayer capacitor according to claim 8, wherein a margin δ of each of the corners having curved surfaces in the cover portions is greater than or equal to a margin Wg of each of the fifth and sixth surfaces.

10. The multilayer capacitor according to claim 9, wherein the margins (δ and Wg) satisfy the following relationship:

1≤δ/Wg≤1.2.

11. The multilayer capacitor according to claim 1, wherein the plurality of internal electrodes have a uniform width.

12. The multilayer capacitor according to claim 1, wherein, in the plurality of internal electrodes, a width of an internal electrode disposed in the cover portion is narrower than a width of an internal electrode disposed in the central portion.

13. The multilayer capacitor according to claim 12, wherein, a width of the internal electrode, disposed closer to the surface of the body among the plurality of internal electrodes disposed in the cover portion, is narrower.

14. The multilayer capacitor according to claim 12, wherein widths of the plurality of internal electrodes are widths in a direction perpendicular to a direction connecting the first surface and the second surface, and widths in a direction perpendicular to the stacking direction of the plurality of dielectric layers.

15. A multilayer capacitor comprising:
a body including:
a stacked structure having dielectric layers, and first and second internal electrodes stacked with the dielectric layers interposed therebetween and respectively exposed from end surfaces of the body, and
a margin covering the stacked structure except the end surfaces; and
first and second external electrodes disposed on the end surfaces of the body and electrically connected to the first and second internal electrodes, respectively,
wherein a surface roughness of the margin is greater than a surface roughness of each of the end surfaces, and
opposing ends of each of the first and second internal electrodes, in a width direction of the body, are in contact with the margin.

16. The multilayer capacitor according to claim 15, wherein the first and second internal electrodes include, central internal electrodes, upper internal electrodes, and lower internal electrodes,
the central internal electrodes are disposed between the upper internal electrodes and the lower internal electrodes,
a difference between a largest width and a smallest width of the central internal electrodes is less than 0.1 µm,
a width of the upper internal electrodes decreases in a direction from the central internal electrodes to the upper internal electrodes, and
a width of the lower internal electrodes decreases in a direction from the central internal electrodes to the lower internal electrodes.

17. The multilayer capacitor according to claim 15, wherein a difference between a largest width and a smallest width of the internal electrodes is less than 0.1 µm, and
a distance, in a stacking direction of the dielectric layers, from an uppermost inner electrode of the first and second internal electrodes to an exterior upper surface of the margin, or a distance, in the stacking direction of the dielectric layers, from a lowermost inner electrode of the first and second internal electrodes to an exterior lower surface of the margin, is greater than a distance, in the width direction of the body, from each of the first and second internal electrodes to an exterior side surface of the margin.

18. The multilayer capacitor according to claim 15, wherein one of the following conditions is satisfied:
0.2 µm<Ra<0.6 µm, in which Ra is the surface roughness of margin based on an average calculation method,
2.0 µm<Rt<5.0 µm, in which Rt is the surface roughness of margin based on a maximum height calculation method, and
2.0 µm<Rz<5.0 µm, in which Rz is the surface roughness of margin based on a ten-point average calculation method.

19. The multilayer capacitor according to claim 15, wherein the margin includes a plurality of layers each having pores.

20. The multilayer capacitor according to claim 15, wherein a thickness of a curved portion of the margin at a corner of the body is equal to greater than a thickness of a flat portion of the margin disposed on a side surface of the body in the width direction.

* * * * *